United States Patent Office 3,769,329
Patented Oct. 30, 1973

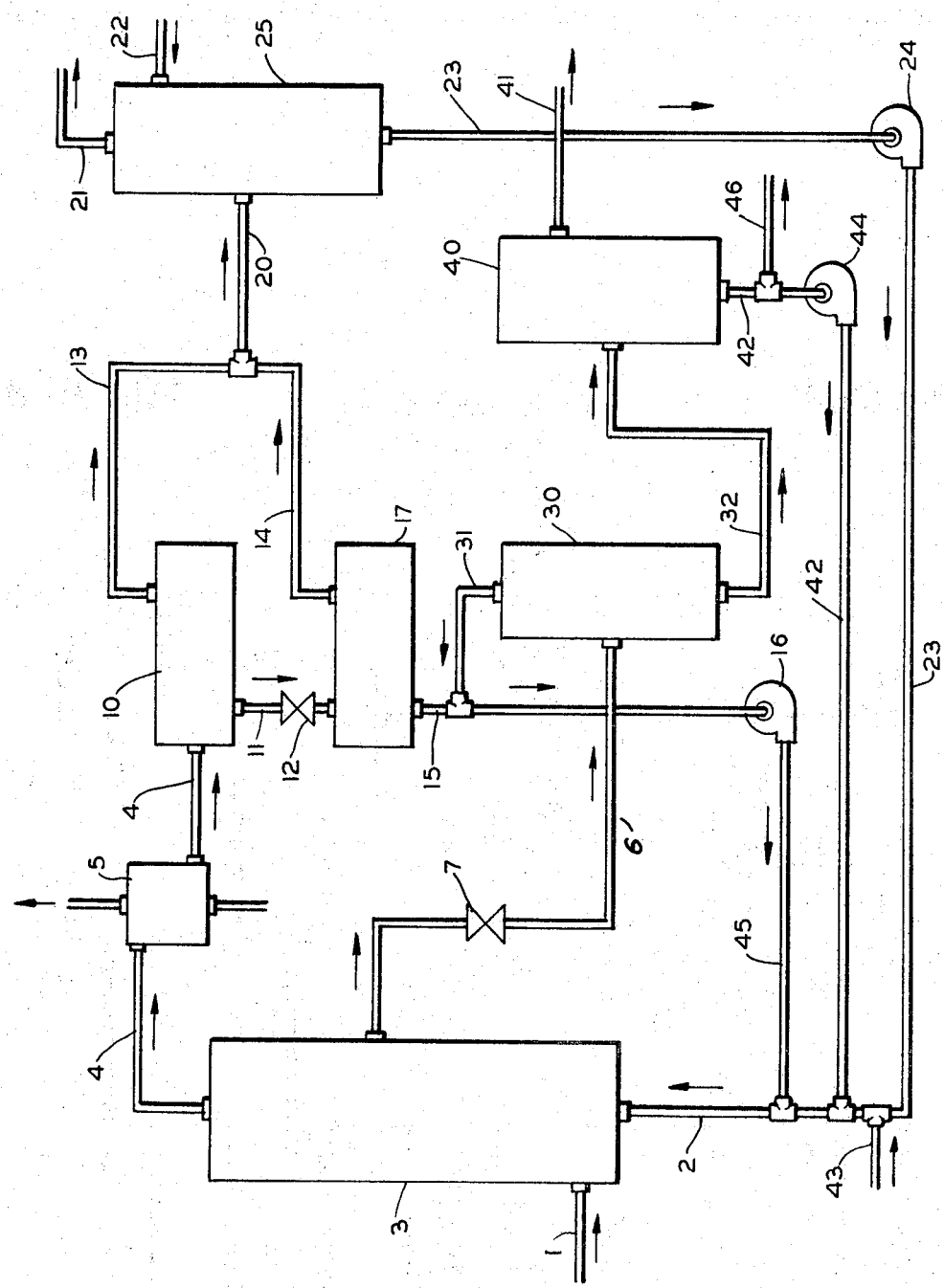

3,769,329
PRODUCTION OF CARBOXYLIC ACIDS
AND ESTERS
Frank E. Paulik and Arnold Hershman, Creve Coeur, Walter R. Knox, Town and Country, and James F. Roth, St. Louis, Mo., assignors to Monsanto Company, St. Louis, Mo.
Continuation-in-part of abandoned application Ser. No. 628,581, Apr. 5, 1967. This application Mar. 12, 1970, Ser. No. 2,413
Int. Cl. C07c 51/12, 67/00
U.S. Cl. 260—488 K  20 Claims

ABSTRACT OF THE DISCLOSURE

The present invention relates to a process for the preparation of carboxylic acids and esters, specifically by the reaction of alcohols or the ester, ether and halide derivatives thereof, with carbon monoxide in the presence of catalyst systems containing as active constituents a rhodium component and a halogen component. The process is also directed to the production of mixtures of organic acids and/or organic esters.

BACKGROUND OF THE INVENTION

This application is a continuation-in-part of application Ser. No. 628,581 filed Apr. 5, 1967, now abandoned.

This application is also a continuation-in-part of copending application Ser. No. 701,637, filed Jan. 30, 1968, now abandoned, which was a continuation-in-part of application Ser. No. 628,581.

This invention relates to a process for the preparation of carboxylic acids and esters. More particularly, it relates to a process for the reaction of alcohols and the ester, ether and halide derivatives thereof, with carbon monoxide in the presence of catalyst systems containing as active constituents a rhodium component and a halogen component to yield carboxylic acids and/or esters selectively and efficiently.

Carbonylation processes for the preparation of carboxylic acids from alcohols are well known in the art and have been directed especially to the production of acetic acid by the carbonylation of methanol. The prior art teaches the use of a number of catalysts for the synthesis of carboxylic acids by reaction of alcohols with carbon monoxide at elevated temperatures and pressures in both vapor phase reactions and liquid phase reactions. Catalysts such as phosphoric acid, phosphates, activated carbon, heavy metal salts such as zinc and cuprous chlorides, silicates of various metals, and boron trifluoride in various hydration states have been reported to function for the production of acetic acid by reaction of methanol and carbon monoxide at elevated temperatures and pressures of the order of 400° C. and 10,000 p.s.i.g., respectively. However, even under such severe conditions the yields of acid were poor. Somewhat less severe reaction conditions of temperature and/or pressure have been reported employing specific catalyst compositions, e.g., 330° C.–340° C. and 2,250 p.s.i.g. using liquid phosphoric acid containing copper phosphate; 300° C.–500° C. and 2,000 p.s.i.g.–4,000 p.s.i.g. using active charcoal impregnated with phosphoric acid; and 260° C.–360° C. and 2,800 p.s.i.g.–15,000 p.s.i.g. using metal carbonyls, such as iron, cobalt and nickel, in conjunction with their halides or free halogens in the liquid phase. Even using these specific catalyst compositions at the less severe reaction conditions, substantially poorer yields of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity. One particular disadvantage of carbonylation processes of the prior art is their dependence upon the use of catalysts comprised of such metal carbonyls or modified metal carbonyls as dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3,000 p.s.i.g. to 10,000 p.s.i.g. under normal carbonylation conditions of 175° C. to 300° C.

Still another disadvantage of carbonylation processes disclosed in the prior art is their relatively low level of activity. This low level of activity requires higher catalyst concentrations, longer reaction times, and higher temperatures to obtain substantial reaction rates and conversions. Consequently larger and costlier processing equipment is required.

Another disadvantage of carbonylation processes disclosed heretofore is their inability to maintain high selectivity to the desired carboxylic acid at temperatures required for high conversion levels and high reaction rates. At these higher temperatures, undesirable byproducts comprising substantial amounts of ethers, aldehydes, higher carboxylic acids, carbon dioxide, methane and water are formed, thereby resulting in substantial yield losses and necessitating additional product purification and recycle steps in the processing.

Another disadvantage of carbonylation processes described in the prior art is their dependence on catalyst systems which require the use of substantially chemically pure carbon monoxide feedstocks to maintain high selectivity and high yield to the desired carboxylic acid product. For example, certain cobalt containing catalyst systems described heretofore when employed with carbon monoxide feed streams containing impurities such as hydrogen, result in the production of a number of undesirable byproducts including methane, carbon dioxide, aldehydes, alcohols of the same carbon number as the desired carboxylic acid, and carboxylic acids of higher carbon number than desired. Consequently, substantial loss in selectivity and yield to the desired carboxylic acid occurs. Catalysts of the prior art cause the formation of troublesome gaseous byproducts such as carbon dioxide and methane as well as dimethyl ether in the reactor system, thereby suppressing the carbon monoxide partial pressure and ultimately causing a decrease in the desired carbonylation reaction rate. Often additional processing steps are required to remove these undesirable byproducts, necessitating the use of larger and costlier processing equipment.

It is, therefore, an object of the present invention to overcome the above disadvantages and thus provide an improved and more economically and commercially feasible carbonylation process for the production of organic acids and their esters.

Another object of this invention is to provide a more reactive and more stable carbonylation catalyst system than has been heretofore described in the prior art.

Still another object of the present invention is to provide a more selective and more reactive carbonylation catalyst system for the production of carboxylic acids.

Another object of the present invention is to provide a carbonylation catalyst system which results in the production of a higher yield of the desired carboxylic acid with no substantial formation of ethers, aldehydes, higher carboxylic acids, carbon dioxide, methane, water and other undesirable byproducts.

Still another object of the present invention is the provision of an improved carbonylation process enabling the efficient and selective production of carboxylic acids or their esters by reaction of alcohols and alcohol derivatives with carbon monoxide in the presence of an improved and more stable catalyst system, thus enabling the use of lower catalyst concentration, lower temperature, lower pressure, and shorter contact time than has been generally possible heretofore and facilitating product isolation, catalyst recovery and recycle without substantial catalyst decomposition and loss.

These and other objects of the present invention will become apparent to those skilled in the art from the accompanying description and disclosure.

SUMMARY OF THE INVENTION

In accordance with the present invention, a feed component comprising a saturated hydrocarbyl alcohol or the ester, ether or halide derivative thereof or mixtures of these are converted to a carboxylic acid or an ester of said feed component and said acid or a mixture of said acid and ester, by reacting the feed component in the liquid phase with carbon monoxide at temperatures from about 50° C. to 300° C. and at partial pressures of carbon monoxide from 1 p.s.i.g. to 15,000 p.s.i.g. and higher, preferably 5 p.s.i.g. to 3,000 p.s.i.g., and more preferably 10 p.s.i.g. to 1,000 p.s.i.g., in the presence of a catalyst system containing as active constituents a rhodium component and a halogen component in which the halogen is selected from the group consisting of bromine and iodine, preferably iodine. The present process is particularly advantageous at lower pressures, although higher pressures may also be used.

DESCRIPTION OF THE DRAWINGS

The accompanying drawing is a flow scheme illustrating an embodiment of the present invention.

DESCRIPTION OF THE PREFERRED EMBODIMENTS

For purposes of the present invention, the catalyst system essentially includes a rhodium component and a halogen component in which the halogen is either bromine or iodine. Generally, the rhodium component of the catalyst system of the present invention is believed to be present in the form of a coordination compound of rhodium with a halogen component providing at least one of the ligands of such coordination compound. In addition to the rhodium and halogen, in the process of the present invention, these coordination compounds also generally include carbon monoxide ligands thereby forming such compounds or complexes of rhodium as $[Rh(CO)_2Br]_2$, $[Rh(CO)_2I]_2$ and the like. Other moieties may be present if desired. Generally, it is preferred that the catalyst system contain as a promoting component, an excess of halogen over that present as ligands in the rhodium coordination compound. The terms "coordination compound" and "coordination complex" used throughout this specification means a compound or complex formed by combination of one or more electronically rich molecules or atoms capable of independent existence with one or more electronically poor molecules or atoms, each of which may also be capable of independent existence.

The essential rhodium and halogen component of the catalyst system of the present invention may be provided by introducing into the reaction zone a coordination compound of rhodium containing halogen ligands or may be provided by introducing into the reaction zone separately a rhodium compound and a halogen compound. Among the materials which may be charged to the reaction zone to provide the rhodium component of the catalyst system of the present invention are rhodium metal, rhodium salts and oxides, organo rhodium compounds, coordination compounds of rhodium, and the like. Specific examples of materials capable of providing the rhodium constituent of the catalyst system of the present invention may be taken from the following non-limiting partial list of suitable materials.

$RhCl_3$
$RhBr_3$
$RhI_3$
$RhCl_3 \cdot 3H_2O$
$RhBr_3 \cdot 3H_2O$
$Rh_2(CO)_4Cl_2$
$Rh_2(CO)_4Br_2$
$Rh_2(CO)_4I_2$
$Rh_2(CO)_8$
$Rh[(C_6H_5)_3P]_2(CO)I$
$Rh[(C_6H_5)_3P]_2(CO)Cl$
Rh metal
$Rh(NO_3)_3$
$RhCl[(C_6H_5)_3P]_2(CH_3I)_2$
$Rh(SnCl_3)[(C_6H_5)_3P]_3$
$RhCl(CO)[(C_6H_5)_3As]_2$
$RhI(CO)[(C_6H_5)_3Sb]_2$
$[(n-C_4H_9)_4N][Rh(CO)_2X_2]$ where X=Cl⁻, Br⁻, I⁻
$[(n-C_4H_9)_4As]_2[Rh_2(CO)_2Y_4]$ where Y=Br⁻, I⁻
$[(n-C_4H_9)_4P][Rh(CO)I_4]$
$Rh[(C_6H_5)_3P]_2(CO)Br$
$Rh[(n-C_4H_9)_3P]_2(CO)Br$
$Rh[(n-C_4H_9)_3P]_2(CO)I$
$RhBr[(C_6H_5)_3P]_3$
$RhI[(C_6H_5)_3P]_3$
$RhCl[(C_6H_5)_3P]_3$
$RhCl[(C_6H_5)_3P]_3H_2$
$[(C_6H_5)_3P]_3Rh(CO)H$
$Rh_2O_3$
$[Rh(C_2H_4)_2Cl]_2$
$K_4Rh_2Cl_2(SnCl_3)_4$
$K_4Rh_2Br_2(SnBr_3)_4$
$K_4Rh_2I_2(SnI_3)_4$ With those materials listed above as capable of providing the rhodium component which do not contain a halogen component from the group consisting of bromine and iodine, it will be necessary to introduce into the reaction zone such a halogen component. For example, if the rhodium component introduced is rhodium metal or $Rh_2O_3$, it will be necessary to also introduce a halide component such as methyl iodide, hydrogen iodide, iodine or the like.

As noted above, while the halogen component of the catalyst system may be in combined form with the rhodium, as for instance, as one or more ligands in a coordination compound of rhodium, it generally is preferred to have an excess of halogen present in the catalyst system as a promoting component. By excess is meant an amount of halogen greater than 2 atoms of halogen per atom of rhodium in the catalyst system. This promoting component of the catalyst system consists of a halogen and/or halogen compound such as hydrogen halide, alkyl- or aryl halide, metal halide, ammonium halide, phosphonium halides, arsonium halide, stibonium halide and the like. The halogen of the promoting component may be the same or different from that already present as ligands in the coordination compound of rhodium. Generally, the halogen in the promoting component is iodine or bromine with iodine being preferred. Accordingly, suitable halogen providing or promoting components may be selected from the following list of halogen and/or halogen-containing compounds.

RX where R=any alkyl- or aryl-group and X= Br or I, e.g., $CH_3I$, $C_6H_5Br$, $CH_3CH_2I$, etc.;

$X_2$ or $X_3^-$ where X=Br or I, e.g., $Br_2$, $I_2$, $I_3^-$, etc.;

HX where X=Br or I, e.g., HBr, HI;

where R=any alkyl- or aryl-group and X=Br or I, e.g.,

etc.;

R₄MX, R₄MX₃, or R₃MX₂ where R=hydrogen or any alkyl, M=N, P, As, or Sb, X=Br or I, e.g., NH₄I, PH₄I₃, PH₃I₂, PH₃Br₂, (C₆H₅)₃PI₂, and/or combinations of R, M, and X.

Although any amount of the promoting component of the catalyst system of the present invention may be employed, the amount employed is such as to produce a ratio of atoms of halogen to atoms of rhodium in the catalyst system of from above 2:1 to 50,000:1 and higher. However, the preferred ratio is 5:1 to 5,000:1 halogen atoms per rhodium atom. A more preferred ratio of halogen atoms to rhodium atoms is 10:1 to 2,500:1.

Generally, it is preferred that the process of the present invention be carried out in an acidic reaction medium. For purposes of the present invention, an acidic reaction medium is defined as one in which an alkyl halide is present or will be formed. The alkyl halide is one in which the alkyl radical corresponds to an alkyl radical of the feed alcohol, ester, ether or halide. For example, if the alcohol is methanol, the alkyl halide will be the methyl halide. Such alkyl halide may be added to the reaction medium as such or may be formed in situ within the reaction medium from the feed acohol, ester, ether or halide and the halide present in the catalyst system. The reaction medium is considered acidic when under reaction conditions as herein set forth, at least 0.1% of the total halogen atoms in the system is present as the alkyl halide. It is preferred, however, that at least 1.0% of the total haolgen atoms in the system is present as the alkyl halide.

The liquid reaction medium employed may include any solvent compatible with the catalyst system and may include pure alcohols, or mixtures of the alcohol feedstock and/or the desired carboxylic acid and/or esters of these two compounds. However, the preferred solvent and liquid reaction medium for the process of this invention is the desired carboxylic acid itself. Water may also be added to the reaction mixture to exert a beneficial effect upon the reaction rate.

Suitable feedstocks are saturated hydrocarbyl alcohols although these alcohols may be charged together with an acid or ester as discussed below. The term "saturated hydrocarbyl," as used herein, is meant to include not only the saturated acyclics, i.e., alkyls, but also the saturated alicyclics, i.e., cycloalkyls, and the alicyclicacyclics. These feedstocks also include the alkyl saturated hydrocarbyl halides, esters and ether derivatives of the desired alcohol feedstock.

Examples of useful feedstocks employed for the carbonylation reaction of the present invention include the following compounds:

ROH wherein R is a saturated hydrocarbyl radical of 1 to 20 carbon atoms,

R'—O—R' wherein R' is a saturated hydrocarbyl radical of 1 to 19 carbon atoms and wherein the total number of carbon atoms in the compound does not exceed 20,

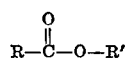

wherein R' is a saturated hydrocarbyl radical of 1 to 19 carbon atoms and wherein the total number of carbon atoms in the compound does not exceed 20, R—X wherein R is a saturated hydrocarbyl radical of 1 to 20 carbon atoms and X is a halogen which is chlorine, bromine or iodine.

The saturated hydrocarbyl radicals in the above compounds include straight-chain, branched-chain and cyclic saturated radicals and generally contain one carbon atom less than that of the desired acid. Included within these feed materials are such specific compounds as methanol, ethanol, propanol and isopropanol, the butanols, pentanols, hexanols, cyclohexanols, cyclopentanols, and also the higher alcohols such as the decanols, dodecanols, hexadecanols, nonadecanols and including isomeric forms, methyl ether, ethyl ether, n-propyl ether, isopropyl ether, n-butyl ether, methyl acetate, ethyl acetate, pentyl acetate, methyl chloride, propyl bromide, heptyl iodide, and the like.

Polyhydric saturated hydrocarbyl alcohols may also be employed as starting materials for the production of polybasic acids, for example, 1,4-butanediol, which when subjected to reaction with carbon monoxide under the conditions described herein with the catalyst of the invention, yields adipic acid.

The most useful feedstocks are the alkanols of 1 to 20 carbon atoms and the ester, ether and halide derivatives thereof. Particularly useful as feedstocks are the alkanols of 1 to 10 carbon atoms and the ester, ether and halide derivatives thereof. Alkanols of 1 to 5 carbon atoms and the ester, ether and halide derivatives thereof are preferred feeds. Methanol is the paticularly preferred feed. It is to be understood that the feed may include a mixture of the above defined alcohols, esters, ethers or halides.

In accordance with the present invention the carbonylation reaction may be carried out by intimately contacting the above defined feed components, preferably an alcohol, which depending on the carbon number and operating conditions may either be in the vapor or liquid phase, with gaseous carbon monoxide in a liquid reaction medium containing a catalyst system such as [Rh(CO)₃I]₂ and a halogen-containing promoting component, such as methyl iodide, under conditions of temperature and pressure suitable as described above to form the carbonylation product. The particular conditions selected are the same whether the feed component is charged as vapor or liquid. The temperature will be in the range of 50° C. to 300° C. with the preferred range being 100° C. to 240° C. Partial pressures of carbon monoxide of the order of 1 p.s.i.g. to 15,000 p.s.i.g. may be employed, however, 5 p.s.i.g. to 3,000 p.s.i.g. carbon monoxide partial pressure is generally preferred, a more preferred range is from 10 p.s.i.g. to 1,000 p.s.i.g. Higher pressures may be used if desired under proper conditions.

Alternatively, carboxylic acids may be produced if desired via reaction of the feed components and carbon monoxide in the vapor phase over the rhodium containing catalyst systems described above, dispersed upon inert supports. Such as catalyst system may be operated as a conventional fixed bed catalystic reactor. For example, methyl alcohol, methyl iodide, and carbon monoxide may be passed over a catalyst system consisting, for example, of [Rh(CO)₂I]₂ dispersed on an inert support material such as alundum, activated carbon, clays, alumina, silica-alumina, and ceramics, etc., in a fixed bed reactor maintained at elevated temperature and pressure, as described above, to produce acetic acid in high yields. However, use of a liquid reaction medium as above described is preferred in the process of this invention.

While any amount of carbon monoxide may be employed, a typical carbonylation reaction selective to carboxylic acid requires at least one mole of carbon monoxide per hydrocarbyl radical (molar basis). Excess of carbon monoxide over the aforesaid stoichiometric amount, however, may be present. Carbon monoxide streams containing inert impurities such as hydrogen, carbon dioxide, methane, nitrogen, noble gases, water and paraffinic hydrocarbons having from 1 to 4 carbon atoms, may be employed, if desired, for example, from an available plant gas stream, with no adverse effect; however, in such cases total reactor pressure will have to be increased to maintain a desired carbon monoxide partial pressure. The concentration of carbon monoxide in the feed gas mixture is from 1 vol. percent to 100 vol. percent, a preferred range being from 10 vol. percent to 99.9 vol. percent.

The reaction rate is dependent upon catalyst concentration and temperature. Concentrations of the rhodium containing component of the catalyst system in the liquid phase between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The active rhodium containing catalytic system is preferably supplied as a catalyst solution. The solution can also include liquid reactants, products and mixtures thereof which function as solvents or reaction media. It has been found that the nature of the products obtained in the present carbonylation process can be controlled by the use of various proportions of alcohol, ester and acid as the solvent for such a catalyst solution. A preferred group of solvents is discussed below for use when reacting the aforementioned preferred saturated hydrocarbyl alcohols having 1 to 20 carbon atoms. This preferred group of solvents is comprised of the alcohol in the feed, an acid having 1 carbon atom more than such alcohol, the ester of the said acid and the said alcohol, the diether of the said alcohol, a halide of the said alcohol and mixtures thereof. A still more preferred group of solvents is comprised of the aforesaid alcohol, the acid, and the ester of the said acid and said alcohol.

It has been found that a preferred range of molar ratios of the said alcohol to the said ester when employing these two components in the liquid reaction medium is from 0.001 to 10,000. However, within this range, there are subranges of ratios of alcohol to ester which are conducive to the formation of particular product distributions.

The use of an alcohol-ester containing liquid reaction medium in which the alcohol to ester molar ratio is less than 2:1, preferably 0.001:1 to 2:1 (and including pure ester as the feed to the reaction) yields a product with a high proportion of acid, e.g., reaching substantially 100% organic acid. Alternatively, the use of such a ratio of alcohol to ester in which the ratio is greater than 10:1, preferably 10:1 to 10,000:1 (including a pure alcohol as the feed) may yield a product with a very high proportion of the ester, e.g., reaching substantially 100% ester.

Within this latter alcohol/ester ratio range of 10:1 to 10,000:1 there exist two alternative embodiments of the invention. In the first such embodiment the product consists essentially of 100% ester at alcohol conversion levels up to about 90 mole percent. The second such embodiment exists when the alcohol conversion level exceeds about 90 mole percent in which instance the product is substatially completely the acid. Within the alcohol to ester ratio range of 2:1 to 10:1 within the reaction medium, the relative proportions of acid and ester in the product may be controlled. As the ester concentration goes down, the ester production goes up subject to the conversion level as above indicated.

The above cases are summarized below.

Alcohol/ester ratio in
reaction medium:         Major product
  0.00:1 to 2:1 _____ Acid.
  2:1 to 10:1 _____ Mixed acid and ester.
  10:1 to 10,000:1—
    (a) To about 90% alcohol conv. _____ Ester.
    (b) Above about 90% alcohol conv. _____ Acid.

The desired acid of one acrbon atoms more than that of the hydrocarbyl radical of the feed component may be present in the reaction mixture, e.g., as solvent. This acid will readily esterify, and the control of the product distribution taught above is applicable, with the ratio of alcohol to ester being the controlling factor.

The preferred ratio range for high ester production is an alcohol/ester ratio in the reaction medium of 10:1 to 10,000:1. The preferred ratio range for high acid production is an alcohol/ester ratio of 0.001:1 to 2:1.

In the carrying out of the above described embodiment for the production of high proportion of acid, e.g., acetic acid, as the desired product, the charge to the reactor includes a relatively low proportion of the alcohol. Thus, in the production of acetic acid as the major product, the ratio generally is no more than 2 moles of methanol per mole of methyl acetate. Consequently the purification system employs a distillation train to recover the acetic acid product by distillation, while the remaining lower boiling components consisting principally of methyl iodide, unreacted methanol, and methyl acetate are recycled.

In the absence of other compounds as solvents having a higher boiling point than acetic acid (discussed below), a portion of the acetic acid product containing the rhodium and halogen catalyst system is recycled to the reactor to return the said catalyst system to the reaction zone.

In carrying out a second embodiment, described above, for the production of high proportion of ester, e.g., methyl acetate, as the desired product, the charge to the reactor includes a relatively high proportion of alcohol, e.g., greater than 10 moles of methanol per mole of methyl acetate. Consequently the purification system employs a distillation train to recover the methyl acetate by distillation, while the remaining components consisting principally of the rhodium containing component, methyl iodide (or other halide promoters) methanol and acetic acid are recycled. The methyl acetate is hydrolyzed for example by contacting with steam, as described herein, thus isolating the acetic acid with the recovery of methanol, which may be recycled. However, the ester product is often used, per se for example, as a solvent in chemical processing or for the formulation of coating compositions. In this embodiment, the process is operated under conditions such as to maintain alcohol conversion below 90%.

When an ester, ether, or halide is present in the feedstock, it is normally charged with equimolar amounts of water, although more or less water may be used. The reference to the ester in the above ratios, is on the basis that molar quantity of water is present equivalent to the number of moles of ester present.

It has been found that water may exert a beneficial effect on the rate of reaction. An amount of water in excess of the equimolar quantity of water to ester, e.g., an excess equal to 50% to 300% of such equimolar quantity, already present with such ester, as discussed above, promotes the production of the carboxylic acid. On the other hand smaller quantities of water, e.g., 50% to 100% of the equimolar proportions discussed above favor the production of ester.

The above catalyst solutions essentially comprised of: (1) the reactant feed component-product acid medium, (2) a rhoidum component, and (3) a halogen component, generally in excess of the rhodium as hereinabove set forth, may be further modified by the addition of a high boiling, inert solvent as a further component. Such an inert solvent must have a boiling point at least 25° C. higher (STP) than the product acid and/or ester. Inert solvents within the present category include paraffin hydrocarbons of from 10 to 30 carbon atoms, aromatic hydrocarbons of from 12 to 40 carbon atoms, organic acids of from 3 to 20 carbon atoms, and esters composed of the aforesaid acids in combination with the feedstocks undergoing carbonylation, and also orthophosphorus and orthosilicon alkoxy esters in which the alkoxy group has the same number of carbon atoms as the feedstock undergoing carbonylation, as well as the chlorine, bromine, and iodine containing derivatives of all of the above said solvents. The followng list exemplifies such solvents: dodecane, hexadecane, naphthalene, biphenyl, propionic acid, octanoic acid, phthalic acid, benzoic acid, dioctyl phthalate, dimethyl phthalate, ethyl benzoate, didecyl phthalate, dimethyl adipate, triphenyl phosphate, tricresyl phosphate, dibutylphenyl phosphate, tetramethyl orthosilicate, tetrabutyl orthosilicate, chloronaphthalene, chlorinated biphenyls, etc.

The inert solvents, as described above, refer to the actual molecular species which are present in the carbonylation reaction mixture. Consequently, modified derivatives may be charged initially, for example, an ester having a number of carbon atoms which is greater or less than the aforesaid ranges by one, two or more carbon atoms. Under reaction conditions in the presence of an alcohol feedstock, such esters undergo ester interchange to equilibrium species which are within the above ranges.

Another embodiment of the process utilizes a high-boiling, inert solvent such as dimethyl phthalate as described above, with the relatively high proportion of an alcohol to ester, as above described, together with an active rhodium component, i.e., a coordination compound of rhodium having halogen ligands, and a halogen containing promoter. In this embodiment, patricularly suitable for use with a gas-sparged reactor system, the feed is a liquid such as methanol with the carbon monoxide introduced in gaseous form. The product stream is then removed as a vapor containing methyl acetate as the principal component. In this embodiment of the invention no liquid is withdrawn, so that a distinct advantage exists because of the elimination of catalyst handling; and, consequently a minimization of catalyst losses. The vapor stream leaving the reactor is then condensed; it contains the methyl acetate which is recovered from the liquid condensate by distillation, and a small proportion of acetic acid which is recycled. The methyl acetate is hydrolyzed with water or steam to yield acetic acid as the major product while the methanol resulting from the hydrolysis of the ester is recycled.

Another embodiment of the invention is based upon the use of the carbonylation reaction as described herein for the purification of hydrogen streams containing small percentages, e.g., 0.1 to 10 percent carbon monoxide by volume. Such a gas stream when available in an industrial plant is often desirable as a source of pure hydrogen, but is very difficult to free from carbon monoxide. The present process based upon the use of rhodium-halogen catalyst systems is readily adaptable to this purification since the carbon monoxide in such a gas mixture readily undergoes reaction with an alcohol, for example, butyl alcohol to yield pentanoic acid. Because of the completeness of reaction, the carbon monoxide is completely removed from the gas mixture while the hydrogen is unreacted, and is easily separated as a pure stream of hydrogen gas. This embodiment of the invention using rhodium-halogen containing catalyst systems represents a major improvement over earlier carbonylation catalyst such as cobalt compounds. The cobalt compounds cannot tolerate the presence of hydrogen since the hydrogen also reacts with the acid and ester products, being catalyzed by the cobalt compounds. Consequently, a major redistribution of products with the production of different, higher acids, alcohols and aldehydes occurs when using cobalt catalysts.

The rhodium-halogen catalyst systems of the present invention are characterized by an unusually high degree of specificity for the carbonylation reaction, e.g., the reaction of alcohols with carbon monoxide to obtain a carboxylic acid. Such control over the various competing reactions to obtain the carboxylic acid in high yield is surprising since other metal catalysts do not show such specificity for this reaction. The iron group metals such as iron, cobalt and nickel differ from the present catalyst systems in that the iron group metals simultaneously catalyze the hydrogenation reactions to a very high degree. Consequently, the products obtained include the next higher alcohols as well as aldehydes and carboxylic acids having 2 more carbon atoms than the starting alcohols. Furthermore, the iron group catalysts, particularly cobalt, require a far higher carbon monoxide partial pressure to remain stable. When moderate pressures, e.g., less than about 2,000 p.s.i.g. carbon monoxide partial pressure are employed, at a temperature of 175° C., the cobalt catalyst is found to plate out or decompose to the free metal which plates on the walls of the reactor and is thus lost as a catalyst.

Another distinction of the rhodium-halogen catalyst systems over the cobalt catalysts is the elimination of undesirable gaseous byproducts, including carbon dioxide and methane which are obtained as a result of the water-gas shift reaction catalyzed by cobalt. Furthermore, significant quantities of the undesirable byproduct, dimethyl ether, are also formed in the presence of the cobalt catalyst system, as shown in Examples 6 and 7 presented below. This particular ether compound attains a very high partial pressure at the reaction conditions employed, and necessitates the use of a high total pressure in the reaction system in order to maintain the necessary partial pressure of carbon monoxide for reaction to form carboxylic acids, e.g., 2,000 p.s.i.g. total pressure for 750 p.s.i.g. carbon monoxide partial pressure, at a reaction temperature of 175° C.

In order to provide a better understanding of the process of the present invention as disclosed and claimed herein, a number of specific embodiments of the process are presented below. The examples and illustrations presented below are not to be construed as in any manner limiting to the scope of the invention.

The accompanying drawing, forming a part of the present specification also illustrates certain embodiments of the invention. Specifically, this drawing illustrates the manufacture of acetic acid using methanol as a feedstock. Referring to the drawing, a carbon monoxide stream is introduced into the reactor 3 through line 1 and is sparged into a liquid reaction medium within the reactor. The carbon monoxide stream may also contain components which are inert to the reaction such as hydrogen, nitrogen, methane, etc. in addition to the carbon monoxide. The reactor 3 contains 2,000 gallons of a liquid medium which contains $5 \times 10^{-3}$ moles (calculated as atomic rhodium)/liter of rhodium which was initially introduced into the reaction medium as $RhCl_3 \cdot 3H_2O$, and 0.6 mole/liter iodide, e.g., as methyl iodide. Through this liquid reaction medium, carbon monoxide is passed at a normal gas rate of 85 lb./min. The reactor is operated at 200° C. and 500 p.s.i.g. pressure. The liquid feed to the reactor is introduced through line 2. The feed to the reactors introduced through line 2, consists of a mixture of a methanol feed stream used to scrub the effluent gas (line 23), a catalyst recycle stream (line 42), a recycle stream containing principally methyl acetate, unreacted methanol, and methyl iodide (line 45), and a make-up stream to maintain the rhodium and iodide concentration in the reactor (line 43). The make-up stream introduced through line 43 may contain a mixture of rhodium and iodide components or only one or the other of such components depending upon need within the reactor 3.

The gaseous reactor effluent exits through line 4, is cooled to about 10° C. in exchanger 5, and goes to high pressure separator 10. The condensed liquid from separator 10 is removed through line 11; the pressure is let down through valve 12, and the liquid then goes to low pressure separator 17. The gas leaving the low pressure separator 17, through line 14, consisting principally of carbon monoxide, methyl iodide, methanol, and methyl acetate, mixes with the gas effluent from the high pressure separator (line 13) which is principally carbon monoxide and enters the methanol scrubber 25 through line 20. In the methanol scrubber 25, feed methanol introduced through line 22 at a rate of about 80 lb./min. is used to remove the small amount of methyl iodide, methyl acetate, and acetic acid from the gas before it leaves the system. The effluent gas containing carbon monoxide exiting through line 21 may either be recycled or if the inert gas content is high, it may be vented or burned. The methanol containing methyl iodide, methyl acetate and acetic acid is removed from scrubber 25 through line 23 and introduced to the reactor as line 23 after being pressured through pump 24.

The liquid effluent from reactor 3 is removed from the reactor through line 6. After pressure let down valve 7, the liquid effluent is introduced into distillation or flash column 30 where the lower boiling compounds are separated from acetic acid and the other less volatile components such as the catalyst system. The lower boiling components consisting principally of methyl acetate, methyl iodide, and unreacted methanol exit through line 31 and mix with the condensed phase from the low pressure separator in line 15 which also contains these low boiling compounds. This mixed stream of lines 15 and 31 is compressed by pump 16 and recycled to the reactor as line 45.

The acetic acid, other higher boiling compounds and the rhodium component are removed as line 32 from column 30 and enter distillation or flash column 40. In this column acetic acid which may contain water, is separated from the other high boiling components including principally the rhodium catalyst components. The acetic acid product is withdrawn as line 41 and may be further purified to remove water. The high boiling components including the rhodium components exit through line 42 and are brought up to reactor pressure by pump 44. If no non-catalytic component higher boiling than acetic acid, such as a high boiling solvent, is present, then some acetic acid may be recycled through line 42 to return the catalyst components to the reactor. A small liquid purge stream may be withdrawn as line 46 to prevent build-up of non-catalytic high boiling compounds. After removal of impurities from line 46, the catalyst components remaining may be added to the make-up stream (line 43).

The process of the present invention may be operated either as a batch or as a continuous process. In batch operation the reactants are charged into the liquid catalyst solution, which is then subjected to the desired temperature and pressure conditions, after which the products are separated from the reaction mixture. In a continuous process which is described above, the catalyst system is maintained in liquid state, with the reactants being continuously supplied to the reaction zone containing the catalyst system at the desired temperature and pressure. The products are continuously withdrawn, either in the vapor state or as described above by withdrawing a portion of the solution containing the catalyst system, unreacted feed, equilibrium components, and the desired product. The desired product is then separated from such solution to permit recycling of the catalyst containing solution which includes unreacted feed and also equilibrium components.

As noted above, the most useful reactants employed in the present processes are essentially alkanols, and derivatives thereof such as ethers, esters and organic halides, having from 1 to 20 carbon atoms, including both straight chain and branched chain components. The second essential component is carbon monoxide. However, the carbon monoxide need not be a high purity stream such as has been required by prior art processes. Instead, the carbon monoxide may be a low-concentration mixture containing from 1 vol. percent to high-concentration streams containing 100 vol. percent of carbon monoxide. In the impure carbon monoxide streams, the remainder of the gas mixture generally is comprised of gases selected from the group consisting of nitrogen, hydrogen, carbon dioxide, noble gases, water and paraffinic hydrocarbons having from 1 to 4 carbon atoms. Preferred ranges of carbon monoxide are from 10 vol. percent to 99.9 vol. percent more preferably greater than 30 vol. percent carbon monoxide.

EXAMPLE 1

A batch reactor is charged with the following ingredients: 0.396 gram of a rhodium compound having the formula $RhCl_3 \cdot 3H_2O$, 28.8 grams of a halogen containing component consisting of methyl iodide, $CH_3I$, 196.9 grams of acetic acid as a solvent, and 79 grams of methanol as feedstock.

The reactor is pressurized with carbon monoxide to a total pressure of 1,000 p.s.i.g., corresponding to a carbon monoxide partial pressure of about 800 p.s.i.g., at the reaction temperature of 175° C. The reaction is carried out at a constant pressure to yield a solution containing the following distribution of products:

| | Wt. percent |
|---|---|
| Acetic acid | 89.0 |
| Methyl iodide | 3.6 |
| Catalyst components, etc. | 7.4 |

The selectivity of the formation of the desired acetic acid product is greater than 95% at substantially 100% conversion of methanol. No substantial amounts of by-products such as aldehydes, dimethyl ether, higher boiling carboxylic acids, methane, or carbon dioxide are formed. The time required for 50% of the methanol to be converted to acetic acid is 335 minutes. The present experiment as well as the other examples, is carried out at a slow rate in order to permit a study of the mechanism of the reaction. However, when the rates are increased to those of a commercial unit, high selectivity and conversions are also obtained.

When this experiment is conducted employing an equivalent molar quantity of cobalt chloride instead of rhodium chloride, the selectivity and yield of the desired acetic acid product are decreased significantly. It has been found that the cobalt catalysts differ radically from the rhodium containing catalyst systems in that the cobalt catalysts also cause hydrogenation reactions such as hydrogenation of the desired carboxylic acid product to aldehydes and alcohols of the same number of carbon atoms. Consequently, the use of cobalt catalyst results in the substantial production of various undesirable byproducts including ethanol, acetaldehyde, and the next higher carbon number carboxylic acid, e.g., propionic acid. Another distinction of the rhodium containing catalyst systems of the present invention over the cobalt catalysts is the elimination of undesirable gaseous byproducts, including carbon dioxide and methane which are obtained as a result of the water-gas shift reaction catalyzed by cobalt. Furthermore, significant quantities of the undesirable byproduct, dimethyl ether, are also formed in the presence of the cobalt catalyst system, as shown in Examples 6 and 7 below. This ether compound attains a very high partial pressure at the reaction conditions employed, and necessitates the use of a high total pressure reaction system to maintain the necessary partial pressure of carbon monoxide for reaction to form carboxylic acids, e.g., 2,000 p.s.i.g. total pressure for 750 p.s.i.g. carbon monoxide partial pressure, at a reaction temperature of 175° C.

Still another distinction of the present rhodium containing catalyst system compared to the cobalt catalysts is the fact that lower carbon monoxide partial pressures can be used without encountering metal plating. This metal plating or decobalting occurs in Example 7 at 2,100 p.s.i.g. carbon monoxide partial pressure, with increasing plating out at lower pressures. In contrast, the present rhodium containing catalyst systems, as in Example 17, do not plate out metal even at 150 p.s.i.g. carbon monoxide partial pressure.

EXAMPLE 2

A batch reactor is charged with the following ingredients: 1.037 grams of a rhodium complex (coordination compound) having the formula $Rh(CO)Cl[C_6H_5)_3P]_2$, 28.8 grams of a halogen containing component consisting of methyl iodide, $CH_3I$ (ratio of halogen provided as $CH_3I$ to rhodium atoms about 140:1), 196.9 grams of acetic acid as a solvent, and 79 grams of methanol as feedstock.

The reactor is pressurized with carbon monoxide to a total pressure of 1,000 p.s.i.g., corresponding to a carbon monoxide partial pressure of about 800 p.s.i.g., at the reaction temperature of 175° C. The reaction is carried out at a constant pressure to yield a solution containing the following distribution of products:

| | Wt. percent |
|---|---|
| Acetic acid | 96.83 |
| Methyl iodide | 1.29 |
| Catalyst components, etc. | 1.88 |

Selectivity to the formation of the desired carboxylic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid is 139 minutes.

This example demonstrates the effect of the use of a rhodium complex in the catalyst system instead of the simple rhodium salt employed in Example 1.

EXAMPLE 3

This example demonstrates the ability to carry out the reaction in the presence of the feedstock as a solvent.

A batch reactor is charged with the following ingredients: 0.198 gram of a rhodium compound having the formula $Rh_2O_3$, 91.5 grams of 57% aqueous HI and 217 grams of methanol as feedstock and solvent. The reactor is pressurized with carbon monoxide to a total pressure of 1,000 p.s.i.g. (partial pressure of carbon monoxide about 700 p.s.i.g.) at the reaction temperature of 175° C. The reaction is carried out at constant pressure to yield a solution containing the following distribution of products:

| | Wt. percent |
|---|---|
| Acetic acid | 82.5 |
| Methyl iodide | 3.0 |
| Catalyst components, etc. | 14.5 |

Selectivity to formation of the carboxylic acid product is greater than 95% at substantially 100% methanol conversion. No undesirable byproducts such as aldehydes, dimethyl ether, higher boiling carboxylic acids, methane, carbon dioxide, etc. are detected by gas chromatography. The time required for 50% of the methanol to be converted to acetic acid is 175 minutes.

This example uses a halogen ratio (atoms of halogen per atom of rhodium) of about 280:1. However, it is found that the use of lower ratios such as 200:1, as well as still lower ratios, such as 10:1 give useful results.

EXAMPLE 4

This example demonstrates the use of an inert solvent. A batch reactor is charged with the following components: 0.396 gram of the rhodium compound having the formula $RhCl_3 \cdot 3H_2O$, 57.5 grams of $CH_3I$, 154 grams of benzene as solvent, and 79 grams of methanol feedstock. The reactor is pressurized with carbon monoxide to a total pressure of 1,000 p.s.i.g. (750 p.s.i.g. partial pressure of carbon monoxide) at the reaction temperature of 175° C. The reaction is carried out at constant pressure to yield a solution containing the following distribution of products on a solvent-free basis:

| | Wt. percent |
|---|---|
| Acetic acid | 62.9 |
| Methyl acetate | 5.0 |
| Methyl iodide | 32.1 |

Selectivity to formation of the carboxylic acid product is greater than 90% at substantially 100% methanol conversion. The methyl acetate which is produced in the reaction is in equilibrium with the various reactants and products, and exerts no deleterious effect on the catalytic reaction system. In a continuous operation, the methyl acetate attains an equilibrium concentration, so that the methyl acetate removed during product separation steps is recycled to the reactor system. Consequently, no yield or selectivity losses occur due to the presence and formation of undesirable byproducts such as aldehydes, higher alcohols, dimethyl ether, higher boiling carboxylic acids. No methane or carbon dioxide are detected by gas chromatography. The time required for 50% of the methanol to be converted to acetic acid is about 300 minutes. The ratio of alcohol to ester in the initial reactor charge is about 10,000:1 (which corresponds to a substantially pure methanol feedstock). Also, the conversion level of the methanol feedstock is greater than 90%.

EXAMPLE 5

This example demonstrates that the reaction may be carried out in the presence of a carbon monoxide stream containing significant quantities of hydrogen without the formation of undesirable products such as acetaldehyde, ethanol, or catalyst decomposition. A batch reactor is charged with 32 grams of 5 wt. percent rhodium metal on carbon, 57.5 grams of $CH_3I$, 154 grams of benzene as solvent, and 79 grams of methanol feedstock. The reactor is pressurized with a gas mixture of 62 vol percent carbon monoxide and 38 vol. percent hydrogen at a total pressure of 2,000 p.s.i.g. (1,100 p.s.i.g. partial pressure of carbon monoxide at a temperature of 175° C. The selectivity to formation of the acetic acid product is greater than 95% at substantially 100% conversion of methanol. No substantial amounts of reduced materials or other byproducts such as aldehydes, dimethyl ether, ethanol, higher boiling carboxylic acids, methane, carbon dioxide, etc. are detected by gas chromatography, thus distinguishing from cobalt catalysts which yield such byproducts as the result of hydrogenation catalyzed by the cobalt. The time required for 50% of the methanol to be converted to acetic acid is 83 minutes.

A similar result is obtained with another synthetic gas mixture, e.g., a 66 vol. percent hydrogen, 33 vol. percent carbon monoxide, such as is obtained from a commercial unit. The various impurities, e.g., nitrogen, hydrogen, carbon dioxide and paraffinic hydrocarbons of 1 to 4 carbon atoms, which are present in such feed gas mixtures, do not adversely affect the present reaction.

EXAMPLE 6

This example demonstrates that cobalt carbonyl is a far less effective catalyst system than the present system containing rhodium and bromine or iodine. A batch reactor is charged with the following ingredients: 2.58 grams of cobalt carbonyl, 28.8 grams of $CH_3I$, 165 grams of benzene as solvent, and 79 grams of methanol feedstock. The reactor is initially pressurized with carbon monoxide to a total pressure of 1,000 p.s.i.g. (750 p.s.i.g. carbon monoxide partial pressure) at the reaction temperature of 175° C. The reaction is carried out at a constant pressure. More than 50 mole percent of the methanol feedstock is converted to dimethyl ether. Water and a trace amount of methyl acetate are also produced. No acetic acid is obtained.

EXAMPLE 7

This example demonstrates that cobalt salts are relatively poor catalysts for the production of acetic acid from methanol even when higher pressure of carbon monoxide and higher temperatures are employed. A batch reactor is charged with the following ingredients: 1.57 grams of $Co(C_2H_3O_2)_2 \cdot 4H_2O$, 3.81 grams of iodine, and 237 grams of methanol feedstock. The reactor is initially pressurized with carbon monoxide to a total pressure of 2,500 p.s.i.g. (2,000 p.s.i.g. carbon monoxide partial pressure) at the reaction temperature of 195° C. Rapid decomposition of the cobalt catalyst to cobalt metal (plating out) occurs. Analysis of the reaction mixture shows that more than 60 mole percent of the methanol feedstock is converted to dimethyl ether. A considerable amount of water is also produced, and less than 5 mole percent of the methanol feedstock is converted to methyl acetate and acetic acid.

EXAMPLE 8

This example demonstrates the use of the product as a solvent for the reaction.

A batch reactor is charged with the following ingredients: 0.10 gram of $RhCl_3 \cdot 3H_2O$, 9.9 grams of 57% aqueous hydrogen iodide, 30.5 grams of acetic acid and 14.0 grams of water, as solvent, and 20.0 grams of methanol as feedstock. The reactor is pressurized with carbon monoxide to a total pressure of 1,000 p.s.i.g. (about 800 p.s.i.g. partial pressure of carbon monoxide) at the reaction temperature of 175° C. The reaction is carried out at constant pressure to yield a solution containing the following distribution of components as determined by gas chromatography.

| | Wt. percent |
|---|---|
| Acetic acid | 76.8 |
| Methyl iodide | Trace |
| Catalyst components, etc. | 23.2 |

No methanol or methyl acetate is detected. The selectivity to formation of carboxylic acid product is greater than 95% at substantially 100% methanol conversion. No undesirable byproducts such as aldehydes, dimethyl ether, higher boiling carboxylic acid, methane, carbon dioxide, etc. are detected by gas chromatography. The time required for 50% of the methanol to be converted to acetic acid is 46 minutes.

EXAMPLE 9

This example demonstrates the effect of partial pressure of carbon monoxide on the reactions.

This example is similar to Example 8 except that the reactor is pressurized with carbon monoxide to a total pressure of 400 p.s.i.g. (about 200 p.s.i.g. carbon monoxide partial pressure) at the reaction temperature of 175° C. The time for 50% of the methanol to be converted to acetic acid is 60 minutes. The composition of the resulting reaction solution, as determined by gas chromatography, is shown below.

| | Wt. percent |
|---|---|
| Acetic acid | 71.7 |
| Catalyst as other components, etc. | 28.3 |

Only a trace amount of methyl iodide and no methanol or methyl acetate is detected. Also, no undesirable byproducts such as aldehydes, dimethyl ether, higher boiling carboxylic acids, methane, carbon dioxide, etc. are detected.

EXAMPLE 10

A batch reactor is charged with the following ingredients: 0.396 gram of a rhodium compound having the formula, $RhCl_3 \cdot 3H_2O$, 32 grams of a halogen containing promoting component consisting of $CaI_2 \cdot H_2O$, 196.9 grams of acetic acid as solvent, and 79 grams of methanol feedstock. The reactor is pressurized with carbon monoxide to a total pressure of 2,000 p.s.i.g. (about 1,800 p.s.i.g. carbon monoxide partial pressure) at the reaction temperature of 175° C. The reaction is carried out at constant pressure to yield a solution containing the following distribution of components, as determined by gas chromatography.

| | Wt. percent |
|---|---|
| Acetic acid | 89.3 |
| Methyl iodide | 2.1 |
| Catalyst components, etc. | 8.6 |

No methanol or methyl acetate is detected. Selectivity to formation of the carboxylic acid product is greater than 95% at substantially 100% methanol conversion. No undesirable byproducts such as aldehydes, dimethyl ether, higher boiling carboxylic acids, methane, carbon dioxide, etc. are detected by gas chromatography. The time required for 50% of the methanol to be converted to acetic acid is 210 minutes.

This example demonstrates that the use of carbon monoxide partial pressures as high as 1,800 p.s.i.g. gives similar results to use of the lower partial pressures of carbon monoxide employed in Examples 8 and 9. The results of Examples 8, 9 and 10 show that the use of high pressures (e.g., 5,000–15,000 p.s.i.g.) such as are required with cobalt catalysts are not necessary when using the rhodium catalysts of the present invention. In addition, this example illustrates the use of an inorganic halogen precursor in an acidic medium.

In the above Examples 8, 9 and 10, the acetic acid solvent and methanol readily esterify to an extent such as to produce a molar ratio of methanol to ester of about 0.001:1 (which corresponds to a substantially pure methyl acetate feedstock). In accordance with the criteria set forth above, the ratio of alcohol to ester is a controlling factor in product distribution. Consequently, the major product of these reactions is acetic acid.

EXAMPLE 11

This example demonstrates that an increase in temperature increases the reaction rate.

This example is similar to Example 9 except that the reaction temperature is 200° C. The composition of the resulting reaction solution is substantially the same as that of Example 9. The time required for 50% of the methanol to be converted to acetic acid is 30 minutes as compared with 60 minutes in Example 9 at a temperature 25° C. lower.

EXAMPLE 12

This example further demonstrates the use of rhodium metal as a catalyst precursor.

A batch reactor is charged with the following ingredients: 3.2 grams of 5 wt. percent of rhodium metal on carbon, 57.5 grams of $CH_3I$, 154 grams of benzene as solvent, and 79 grams of methanol feedstock. The reactor is pressurized with carbon monoxide to a total pressure of 1,000 p.s.i.g. (carbon monoxide partial pressure about 750 p.s.i.g.) at the reaction temperature 175° C. The reaction is carried out at constant pressure to yield a solution containing the following distribution of products (exclusive of solvent and catalyst components):

| | Wt. percent |
|---|---|
| Acetic acid | 90.5 |
| Methyl iodide | 9.5 |

Selectivity to formation of the carboxylic acid product is greater than 95% at substantially 100% conversion of methanol. No substantial amounts of byproducts such as aldehydes, dimethyl ether, higher boiling carboxylic acid, methane and carbon dioxide are detected by gas chromatography. The time required for 50% of the methanol to be converted to acetic acid of 93 minutes.

EXAMPLE 13

This example demonstrates the effect of the rate of reaction as a function of the concentration of iodine as an iodine containing component. The conditions and distribution of products in this example are similar to Example 9 except that only 5.0 grams of 57% aqueous hydrogen iodide is added. The selectivity to formation of carboxylic acid product is greater than 95% at substantially 100% conversion of methanol. No substantial amounts of byproducts such as aldehydes, dimethyl ether, higher boiling carboxylic acid, methane, carbon dioxide, etc. are detected by gas chromatography. The time required for 50% of the methanol to be converted to acetic acid is 170 minutes as compared with 60 minutes in Example 9 when approximately twice as much hydrogen iodide is used.

The ratio of alcohol to ester in the reaction medium in Examples 12 and 13 is about 10,000:1 (which corresponds to a substantially pure methanol feedstock) even in the presence of benzene as an inert solvent. Also the conversion level of the methanol feedstock is greater than 90%. In accordance with criteria set forth above, the major product of this reaction is acetic acid.

EXAMPLE 14

A batch reactor is charged with the following ingredients: 0.636 gram of a rhodium compound having the formula $RhI_3$, 25.5 grams of 57% aqueous hydrogen iodide, 196.9 grams of acetic acid as a solvent, and 79 grams of methanol as feedstock.

The reactor is pressurized with carbon monoxide to a total pressure of 1,000 p.s.i.g. (corresponding to a carbon monoxide partial pressure of about 800 p.s.i.g.) at the reaction temperature of 175° C. The reaction is carried out at a constant pressure to yield a solution containing the following distribution of products:

| | Wt. percent |
|---|---|
| Acetic acid | 87.9 |
| Methyl iodide | 2.7 |
| Catalyst components, etc. | 9.4 |

Selectivity to the formation of the desired carboxylic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid is 225 minutes.

This example demonstrates the changing of a part of the iodine with the rhodium as rhodium iodide.

EXAMPLE 15

A batch reactor is charged with the following ingredients: 0.396 gram of $RhCl_3 \cdot 3H_2O$, 18 grams of water, 33.6 grams of potassium iodide (ratio atoms I/Rh about 143:1), 178.5 grams of acetic acid as a solvent, and 79 grams of methanol as feedstock.

The reactor is pressurized with carbon monoxide to a total pressure of 1,000 p.s.i.g. (corresponding to a carbon monoxide partial pressure of about 800 p.s.i.g.) at the reaction temperature of 175° C. Little, if any, reaction is observed. Analysis of a liquid sample withdrawn from the reactor via gas chromatography indicates essentially no methyl iodide present in the reaction mixture. However, upon subsequent addition of the mineral acid, $H_3PO_4$, the reaction initiates and forms the following distribution of products:

| | Wt. percent |
|---|---|
| Acetic acid | 91.3 |
| Methyl iodide | 6.2 |
| Catalyst components, etc. | 2.5 |

Selectivity to the formation of the desired carboxylic acid product is greater than 95% at substantially 100% conversion of methanol. No substantial amounts of by-products such as aldehydes, dimethyl ether, higher boiling carboxylic acids, methane, or carbon dioxide are formed. The time required for 50% of the methanol to be converted to acetic acid after the mineral acid addition, is 169 minutes.

In separate experiments, similar results are obtained employing HCl, HBr and $H_3PO_3$ as the mineral acid.

EXAMPLE 16

A batch reactor is charged with the following ingredients: 1.17 grams of a rhodium compound having the formula $Rh(CO)Cl[As(C_6H_5)_3]_2$, 28.8 grams of methyl iodide, 196.9 grams of acetic acid as a solvent, and 79 grams of methanol as feedstock.

The reactor is pressurized with carbon monoxide to a total pressure of 1,000 p.s.i.g. (corresponding to a carbon monoxide partial pressure of about 800 p.s.i.g.) at the reaction temperature of 175° C. The reaction is carried out at a constant pressure to yield a solution containing the following distribution of products:

| | Wt. percent |
|---|---|
| Acetic acid | 86.1 |
| Methyl iodide | 1.6 |
| Catalyst components, etc. | 12.3 |

Selectivity to the formation of the desired carboxylic acid product is greater than 95% at substantially 100% conversion of methanol. No substantial amounts of by-products such as aldehydes, dimethyl, ether, higher boiling carboxylic acids, methane, or carbon dioxide are formed. The time required for 50% of the methanol to be converted to acetic acid is 166 minutes.

This example demonstrates the wide range of compounds useful as a source of the rhodium component of the present catalyst system.

EXAMPLE 17

A batch reactor is charged with the following ingredients: 0.05 gram of $RhCl_3 \cdot 3H_2O$, 5.0 grams of 57 wt. percent hydrogen iodide, 3.3 grams of acetic acid and 16.4 grams of water as solvent, and 20 grams of methanol as feedstock.

The reactor is pressurized with carbon monoxide to a total pressure of 450 p.s.i.g. (corresponding to a carbon monoxide partial pressure of about 150 p.s.i.g.) at the reaction temperature of 200° C. The reaction is carried out at a constant pressure to yield a solution containing the following distribution of products:

| | Wt. percent |
|---|---|
| Acetic acid | 73.4 |
| Methyl iodide | Trace |
| Catalyst component, etc. | 26.6 |

Selectivity to the formation of the desired carboxylic acid product is greater than 95% at substantially 100% conversion of methanol. No substantial amounts of by-products such as aldehydes, dimethyl ether, higher boiling carboxylic acids, methane, or carbon dioxide are formed. The time required for 50% of the methanol to be converted to acetic acid is 113 minutes.

The present work demonstrates that good reactivity is obtained even at low carbon monoxide partial pressure, and extending down to about 1 p.s.i.g. partial pressure and lower, as compared to Example 3, and Example 20, below, which latter shows the reaction to proceed to zero partial pressure of carbon monoxide.

EXAMPLE 18

A batch reactor is charged with the following ingredients: 0.396 gram of $RhCl_3 \cdot 3H_2O$, 28.8 grams of methyl iodide, 178.5 grams of acetic acid as a solvent, and 79 grams of methanol as feedstock and 18 grams water.

The reactor is pressurized with carbon monoxide to a total pressure of 1,000 p.s.i.g. (corresponding to a carbon monoxide partial pressure of about 800 p.s.i.g.) at the reaction temperature of 175° C. The reaction is carried out at a constant pressure to yield a solution containing the following distribution of products:

| | Wt. percent |
|---|---|
| Acetic acid | 90.34 |
| Methyl iodide | 3.65 |
| Catalyst components, etc. | 6.01 |

Selectivity to the formation of the desired carboxylic acid product is greater than 95% at substantially 100% conversion of methanol. No substantial amounts of by-products such as aldehydes, dimethyl ether, higher boiling carboxylic acids, methane or carbon dioxide are formed. The time required for 50% of the methanol to be converted to acetic acid in 133 minutes.

This example demonstrates the effect of adding water to the reaction medium.

EXAMPLE 19

A batch reactor is charged with the following ingredients: 0.396 gram of $RhCl_3 \cdot 3H_2O$, 51.0 grams of 57% aqueous hydrogen iodide, and 215 grams of a methanol feedstock containing 10 wt. percent dimethyl ether.

The reactor is pressurized with carbon monoxide to a total pressure of 1,000 p.s.i.g. (corresponding to a carbon monoxide partial pressure of about 700 p.s.i.g.) at the reaction temperature of 175° C. The reaction is carried out at a constant pressure to yield a solution containing the following distribution of products:

| | Wt. percent |
|---|---|
| Acetic acid | 88.2 |
| Methyl iodide | 6.3 |
| Catalyst components, etc. | 5.5 |

Selectivity to the formation of the desired carboxylic acid product is greater than 95% at substantially 100% conversion of methanol. No substantial amounts of by-products such as aldehydes, dimethyl ether, higher boiling carboxylic acids, methane, or carbon dioxide are formed. The time required for 50% of the methanol to be converted to acetic acid is 269 minutes.

This example demonstrates the effect of a mixed feedstock in which an ether is present in the alcohol. Thus the commercial alcohol-ether product from a methanol plant is shown as having no deleterious effect on the reaction.

EXAMPLE 20

A batch reactor is charged with the following ingredients: 0.396 gram of $RhCl_3 \cdot 3H_2O$, 28.8 grams of methyl iodide, 25.6 grams of acetic acid, 36.8 grams of water, 49.1 grams of methanol, and 151.2 grams of methyl acetate, which corresponds to the equilibrium concentrations of the ester and water components under the reaction conditions employed. The reactor is pressurized with carbon monoxide to a total pressure of 1,000 p.s.i.g. (corresponding to a carbon monoxide partial pressure of about 750 p.s.i.g.) at the reaction temperature of 175° C. The reaction is carried out at a constant volume until substantially all of the carbon monoxide is reacted (final reactor pressure about 250 p.s.i.g., corresponding to substantially zero partial pressure of carbon monoxide because of the complete reaction of carbon monoxide).

The reaction product distribution which is obtained has substantially the same methyl acetate and water concentrations as initially charged: however, 60 wt. percent of the methanol charged to the reactor is converted to acetic acid.

No substantial amounts of byproducts such as aldehydes, dimethyl ether, higher boiling carboxylic acids, methane or carbon dioxide are formed. The time required for substantially all of the carbon monoxide to be reacted with methanol and thus converted to acetic acid is 90 minutes which corresponds to a space-time yield (STY) of about 2.0 moles of product/liter of catalyst solution/hour. The rate of carbon monoxide conversion is changed by a factor of less than 2 over this total conversion range. It is also noted that the rate parameters of this, and the other examples is obtained when using a rate sufficiently low to permit a study of the reaction mechanism. However, when the rates are increased to those of a commercial unit, the same high selectivity and conversions are maintained.

This example demonstrates the process concept of operating a continuous reactor to produce acetic acid from methanol while maintaining equilibrium recycle streams of the ester (methyl acetate) and water, and resulting in a net conversion of the methanol feedstock to the desired acetic acid product while maintaining the said equilibrium conditions.

EXAMPLE 21

A continuous reaction system is operated in which methanol and the equilibrium concentrations of methyl acetate and water are obtained from a commercial plant recycle system. The catalyst system including the methyl iodide, and the feed mixture of Example 20, is continuously passed through a tubular reaction zone maintained at 175° C. yielding a similar result to that of Example 20. The use of a distillation separation train to recover unreacted methanol, and the equilibrium components methyl acetate and water, as well as the acetic acid product, permits the recycling of the catalyst. Another product of the continuous reaction is the equilibrium mixture of methyl acetate and water, which may be recycled.

EXAMPLE 22

A batch reactor is charged with the following ingredients: 0.1 gram of $RhCl_3 \cdot 3H_2O$, 2.5 grams of elemental iodine, 15 grams of water as solvent, and 79 grams of methanol as feedstock.

The reactor is pressurized with carbon monoxide to a total pressure of 1,300 p.s.i.g. (corresponding to a carbon monoxide partial pressure of about 1,100 p.s.i.g.) at the rection temperature of 175° C. The reaction is carried out at a constant pressure to yield a solution containing the following distribution of products:

| | Wt. percent |
|---|---|
| Actic acid | 26.8 |
| Methyl acetate | 26.3 |
| Catalyst components, etc. including unreacted methanol | 46.9 |

No significant amounts of byproducts such as aldehydes, ether, higher boiling carboxylic acids, or carbon dioxide are formed.

EXAMPLE 23

A batch reactor is charged with the following ingredients: 1.04 grams of a rhodium compound having the formula $[(C_6H_5)_3P]_2RhCOCl$, 51 grams of aqueous 57% hydroiodic acid, 179 grams of benzene as a solvent, and 100 grams of 1,4-butanediol as feedstock.

The reactor is pressurized with carbon monoxide to a total pressure of 500 p.s.i.g. (corresponding to a carbon monoxide partial pressure of about 425 p.s.i.g.) at the reaction temperature of 195° C. The reaction is carried out at a constant pressure to yield a solution containing the following distribution of products:

| | Wt. percent |
|---|---|
| Adipic acid | 32.3 |
| Catalyst components, etc. | 67.7 |

No substantial amounts of byproducts such as aldehydes, ether, higher boiling carboxylic acids, paraffins or carbon dioxide are formed in the reaction of the di-alcohol. Thus one carbonyl group is added at each alcohol group when using the catalyst system to carbonylate di-alcohols.

EXAMPLE 24

A batch reactor is charged with the following ingredients: 0.396 gram of $RhCl_3 \cdot 3H_2O$, 51 grams of aqueous 57% hydroiodic acid, 150 grams of benzene as a solvent, and 82 grams of heptanol as feedstock.

The reactor is pressurized with carbon monoxide to a total pressure of 500 p.s.i.g. (corresponding to a carbon monoxide partial pressure of about 425 p.s.i.g.) at the reaction temperature of 175° C. The reaction is carried out at a constant pressure to yield a solution containing the following distribution of products:

| | Wt. percent |
|---|---|
| Octanoic acid | 35.5 |
| Catalyst and unreacted feed components, etc. | 64.5 |

No substantial amounts of by products such as aldehydes, ethers, higher boiling carboxylic acids, paraffins or carbon dioxide are formed.

This example demonstrates the ability of the catalyst system to carbonylate long chain saturated alcohols.

EXAMPLE 25

A batch reactor is charged with the following ingredients: 0.396 gram of $RhCl_3 \cdot 3H_2O$, 51 grams of 57% aqueous hydrogen iodide and 215 grams of tertiary butyl alcohol as feedstock.

The reactor is pressurized with carbon monoxide to a total pressure of 500 p.s.i.g. (corresponding to a carbon monoxide partial pressure of about 400 p.s.i.g.) at the reaction temperature of 195° C. The reaction is carried out at a constant pressure to yield a solution containing the following distribution of products:

| | Wt. percent |
|---|---|
| Mixture of pivalic and isovaleric acids | 82.4 |
| Catalyst components, etc. | 17.6 |

No substantial amounts of by products such as aldehydes, ethers, high boiling carboxylic acids, paraffins or carbon dioxide are formed.

This example demonstrates ability of the catalyst system to carbonylate tertiary alcohols.

EXAMPLE 26

A batch reactor is charged with the following ingredients: 0.396 gram of $RhCl_3 \cdot 3H_2O$, 51 grams of 57% aqueous hydrogen iodide and 214 grams of isopropyl alcohol as feedstock.

The reactor is pressurized with carbon monoxide to a total pressure of 500 p.s.i.g. (corresponding to a carbon monoxide partial pressure of about 400 p.s.i.g.) at the reaction temperature of 175° C. The reaction is carried out at a constant pressure to yield a solution containing the following distribution of products:

| | Wt. percent |
|---|---|
| Normal and isobutyric acids | 79.4 |
| Catalyst components, etc. | 20.6 |

No substantial amounts of byproducts such as aldehydes, ethers, higher boiling carboxylic acids, paraffins or carbon dioxide are formed.

This example demonstrates the ability of the catalyst system to carbonylate secondary alcohols.

EXAMPLE 27

A batch reactor is charged with the following ingredients: 0.396 gram of $RhCl_3 \cdot 3H_2O$, 21.6 grams of water, 28.8 grams of methyl iodide, 89 grams of methyl acetate, and 128 grams of methanol as feedstock, which is equivalent to an alcohol to ester mole ratio of about 3.4:1.

The reactor is pressurized with carbon monoxide to a total pressure of 500 p.s.i.g. (corresponding to a carbon monoxide partial pressure of about 250 p.s.i.g.) at the reaction temperature of 175° C. The reaction is carried out at a constant pressure to yield a solution having the following composition:

| | Wt. percent |
|---|---|
| Methyl acetate | 51.2 |
| Acetic acid | 16.9 |
| Methyl iodide | 4.1 |
| Catalyst, etc. | 17.6 |
| Methanol | 10.2 |

Selectivity to the formation of the desired ester and acid product is about 98% at about 75% conversion of methanol. No substantial amounts of byproducts such as aldehydes, dimethyl ether, higher boiling carboxylic acids, methane, and/or carbon dioxide are formed. The time required for the reaction is 135 minutes. The product distribution of the mixture of acid and ester products is in accordance with the criteria set forth herein for an alcohol/ester feed ratio in the range of 2 to 10. The reaction in this example results in a net production of 78 grams of methyl acetate and 54 grams of acetic acid.

EXAMPLE 28

A batch reactor is charged with the following ingredients: 0.396 gram of $RhCl_3 \cdot 3H_2O$, 28.8 grams of methyl iodide, 72 grams of acetic acid as a solvent, and 167 grams of methanol as feedstock, which after esterification of the acid and methanol results in the same alcohol/ester feed ratio of 3.4, as in Example 27, in the reaction medium.

The reactor is pressurized with carbon monoxide to a total pressure of 500 p.s.i.g. (corresponding to a carbon monoxide partial pressure of about 250 p.s.i.g.) at the reaction temperature of 175° C. The reaction is carried out at a constant pressure to yield a solution containing substantially the same product distribution as in Example 27 under similar reaction conditions.

In accordance with the criteria set forth herein, the product distribution is controlled by the alcohol/ester feed ratio after equilibration through esterification even when the initially charged feed contains only organic acid and alcohol instead of the preformed ester of the two compounds. Consequently the product distribution is a mixture of acid and ester products in accordance with the alcohol/ester ratio range of 2 to 10.

EXAMPLE 29

A batch reactor is charged with the following ingredients: 0.396 gram of $RhCl_3 \cdot 3H_2O$, 25.5 grams of 57 wt. percent aqueous hydrogen iodide, 30 grams of acetic acid as a solvent, and 210 grams of methanol as feedstock, which, after esterification of the acid and alcohol, results in an alcohol to ester mole ratio of about 12:1 after equilibration.

The reactor is pressurized with carbon monoxide to a total pressure of 500 p.s.i.g. (corresponding to a carbon monoxide partial pressure of about 250 p.s.i.g.) at the reaction temperature of 175° C. The reaction is carried out at a constant pressure to yield a solution having the following composition:

| | Wt. percent |
|---|---|
| Methyl acetate | 52.5 |
| Acetic acid | 5.0 |
| Methyl iodide | 1.5 |
| Catalyst components, etc. | 18.0 |
| Methanol | 23.0 |

Selectivity to the formation of the desired ester product is about 90% at about 63% conversion of methanol. No substantial amounts of byproducts such as aldehydes, dimethyl ether, higher boiling carboxylic acids, methane, and/or carbon dioxide are formed. The time required for the reaction is 100 minutes. The product distribution of a high proportion of ester is in accordance with the criteria set forth herein for an alcohol/ester feed ratio greater than 10, and a methanol conversion of less than 90%.

In this example after equilibration of the initially charged feed mixture, the solution contains about 37 grams of methyl acetate, 196 grams of methanol and only about 0.5 gram of acetic acid. After the reaction, the solution contains about 170 grams of methyl acetate and 18 grams of acetic acid which corresponds to a net production of 133 grams of methyl acetate and 17.4 grams of acetic acid which represents approximately 88.9 wt. percent methyl acetate in the product.

EXAMPLE 30

Example 8 is substantially repeated with the exception that hydrogen bromide is substituted for the hydrogen iodide of such Example 8. Acetic acid is formed in such reaction.

What is claimed is:

1. A process for the carbonylation of reactants selected from the group consisting of compounds having the formulas ROH where R is a saturated hydrocarbyl radical of 1 to 20 carbon atoms, R'—O—R' wherein R' is a saturated hydrocarbyl radical of 1 to 19 carbon atoms and wherein the total number of carbon atoms in the compound does not exceed 20,

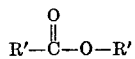

wherein R' is a saturated hydrocarbyl radical of 1 to 19 carbon atoms and wherein the total number of carbon atoms in the compound does not exceed 20, and R—X wherein R is a saturated hydrocarbyl radical of 1 to 20 carbon atoms and X is a halogen selected from the group consisting of chlorine, bromine and iodine, said process comprising contacting
(1) at least one of said reactants,
(2) carbon monoxide, and
(3) a catalyst system consisting essentially of
(a) a rhodium compound, and
(b) a halogen component wherein during said contacting, said rhodium compound and said halogen component are present in an amount sufficient to catalyze the carbonylation of said reactants, said contacting being carried out at a temperature in the range of 50 to 300° C. and at a carbon monoxide partial pressure in the range of 1 to 15,000 p.s.i.g., and when said reactants consist of compounds having the formulas

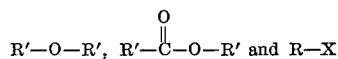

said contacting is also in the presence of water, and said halogen component of (3b) is bromine, iodine, a bromide compound or an iodide compound.

2. The process of claim 1 wherein at least a portion of said halogen component of (3b) is iodine or an iodide compound.

3. The process of claim 2 wherein said contacting is carried out in an aqueous acidic reaction medium.

4. The process of claim 2 wherein said halogen component of (3b) is present in an amount of above two atoms of halogen per atom of rhodium.

5. The process of claim 1 wherein said rhodium compound of (3a) and said halogen component of (3b) are contained in a liquid reaction medium.

6. The process of claim 5 wherein said halogen component of (3b) is present in an amount such as to produce a halogen to rhodium atomic ratio of from above 2:1 to 50,000:1.

7. The process of claim 6 wherein said halogen component is an iodide compound.

8. The process of claim 7 wherein said liquid reaction medium contains water and when said reactants consist of compounds having the formula

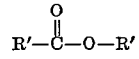

said water is present during said contacting in a 50 to 300% excess of the amount of water required to be in equimolar relation to said compounds having the formula

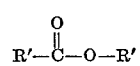

9. The process of claim 8 wherein said reactants are selected from the group consisting of methanol, methyl acetate, dimethyl ether and methyl chloride.

10. The process of claim 1 wherein said reactants are a mixture of methanol and methyl acetate.

11. The process of claim 1 wherein said rhodium compound of (3a) is dispersed upon an inert solid support.

12. The process of claim 11 wherein said carbonylation is carried out in the vapor phase.

13. A process for the carbonylation of reactants selected from the group consisting of methanol, dimethyl ether, methyl acetate, and methyl chloride, said process comprising contacting
(1) at least one of said reactants,
(2) carbon monoxide, and
(3) a catalyst system consisting essentially of
(a) a rhodium compound, and
(b) a halogen component wherein during said contacting, said rhodium compound and said halogen component are present in an amount sufficient to catalyze the carbonylation of said reactants, said contacting being carried out at a temperature in the range of 50 to 300° C. and at a carbon monoxide partial pressure in the range of 1 to 15,000 p.s.i.g., at least a portion of said halogen component being provided by hydrogen iodide, hydrogen bromide, methyl iodide or methyl bromide and said contacting also being carried out in an aqueous acidic reaction medium.

14. The process of claim 13 wherein said reactant is methanol and at least a portion of said halogen component of (3b) being provided by methyl iodide.

15. The process of claim 13 wherein said reactants are a mixture of methanol and methyl acetate and at least a portion of said halogen component of (3b) being provided by methyl iodide.

16. A process for the carbonylation of reactants selected from the group consisting of compounds having the formulas ROH where R is a saturated hydrocarbyl radical of 1 to 20 carbon atoms, R'—O—R' wherein R' is a saturated hydrocarbyl radical of 1 to 19 carbon atoms and wherein the total number of carbon atoms in the compound does not exceed 20,

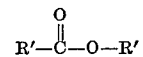

wherein R' is a saturated hydrocarbyl radical of 1 to 19 carbon atoms and wherein the total number of carbon atoms in the compound does not exceed 20, and R—X wherein R is a saturated hydrocarbyl radical of 1 to 20 carbon atoms and X is a halogen selected from the group consisting of chlorine, bromine and iodine, said process comprising contacting
(1) at least one of said reactants,
(2) carbon monoxide, and
(3) a catalyst system consisting essentially of
(a) a rhodium compound, and
(b) a halogen component wherein during said contacting, said rhodium compound and said halogen component are present in an amount sufficient to catalyze the carbonylation of said reactants and said halogen component is present in an amount of above two atoms of halogen per atom of rhodium, said contacting being carried out at a temperature in the range of 50 to 300° C. and at a carbon monoxide partial pressure in the range of 1 to 15,000 p.s.i.g., and when said reactants consist of compounds having the formulas

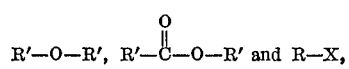

said contacting is also in the presence of water, said rhodium compound of (3a) is provided by a material selected from the group consisting of rhodium salts, rhodium oxides, and rhodium carbonyls consisting only of rhodium and carbonyl moieties and said halogen component of (3b) is provided by bromine, iodine, a bromide compound or an iodide compound.

17. The process of claim 16 wherein said reactants comprise a mixture of methanol and methyl acetate, said halogen component of (3b) is provided by iodine or an iodide compound, said iodine or iodide compound being present in an amount such as to produce an iodine to rhodium atomic ratio within the range of above 2:1 to 50,000:1, said rhodium compound of (3a) and said iodine or iodide compound being contained in a liquid reaction medium and said liquid reaction medium contains water.

18. The process of claim 16 wherein said rhodium compound of (3a) is dispersed upon an inert solid support.

19. The process of claim 18 wherein said carbonylation is carried out in the vapor phase.

20. The process of claim 16 wherein said reactant is methanol, at least a portion of the halogen component of (3b) is methyl iodide and said contacting is carried out in an aqueous acidic reaction medium.

References Cited
UNITED STATES PATENTS

| | | | |
|---|---|---|---|
| 2,739,169 | 3/1956 | Hagemeyer, Jr. | 260—540 |
| 2,710,878 | 6/1955 | Glasebrook | 260—532 |
| 3,020,314 | 2/1962 | Alderson | 260—533 |
| 3,065,242 | 11/1962 | Alderson et al. | 260—497 |
| 3,338,961 | 8/1967 | Classon et al. | 260—544 |
| 3,364,961 | 2/1968 | Brewbaker | 260—486 |

VIVIAN GARNER, Primary Examiner

U.S. Cl. X.R.

260—410.9R, 413, 468 CB, 485 G, 491, 493, 496, 514 C, 532, 537 R, 540, 541